US011860877B2

(12) United States Patent
Dumitru

(10) Patent No.: US 11,860,877 B2
(45) Date of Patent: Jan. 2, 2024

(54) STREAMING DATA ANALYTICS USING DATA PIPELINES AND KNOWLEDGE GRAPHS

(71) Applicant: Dell Products L.P., Round Rock, TX (US)

(72) Inventor: Aurelian Dumitru, Round Rock, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 17/663,891

(22) Filed: May 18, 2022

(65) Prior Publication Data

US 2023/0376489 A1     Nov. 23, 2023

(51) Int. Cl.
*G06F 16/2455* (2019.01)
*G06N 5/022* (2023.01)

(52) U.S. Cl.
CPC .. *G06F 16/24568* (2019.01); *G06F 16/24552* (2019.01); *G06N 5/022* (2013.01)

(58) Field of Classification Search
CPC ........ G06F 16/24568; G06F 16/24552; G06N 5/022
See application file for complete search history.

(56) References Cited

U.S. PATENT DOCUMENTS

| 10,579,623 | B2* | 3/2020 | Kafai | G06F 16/24568 |
|---|---|---|---|---|
| 10,943,072 | B1* | 3/2021 | Jaganmohan | G06N 3/045 |
| 10,996,878 | B2* | 5/2021 | Das | G06F 3/0604 |
| 11,657,425 | B2* | 5/2023 | Park | G06F 16/24522 |
| | | | | 705/14.49 |
| 2017/0243236 | A1* | 8/2017 | Dhillon | G06Q 30/0201 |
| 2018/0089328 | A1* | 3/2018 | Bath | G06F 16/24568 |
| 2019/0243836 | A1* | 8/2019 | Nanda | G06F 16/24568 |
| 2020/0081445 | A1* | 3/2020 | Stetson | G06N 5/02 |
| 2021/0303578 | A1* | 9/2021 | Dua | G06F 16/243 |

* cited by examiner

*Primary Examiner* — Jorge A Casanova
(74) *Attorney, Agent, or Firm* — Workman Nydegger

(57) ABSTRACT

One example method includes receiving a data stream that comprises data in a form of multi-dimensional data structures. The data stream may be received in real time as it is generated. Metadata about the data may be generated and stored. Further, portions of the data may be selected and cached, and the cached data analyzed in real time. Based on the analyzing, various insights may be generated concerning the data that was analyzed.

16 Claims, 3 Drawing Sheets

STREAMING DATA ANALYTICS USING DATA PIPELINES AND KNOWLEDGE GRAPHS

FIELD OF THE INVENTION

Embodiments of the present invention generally relate to data analytics. More particularly, at least some embodiments of the invention relate to systems, hardware, software, computer-readable media, and methods for reducing or eliminating delays in evaluating and transforming raw data into actionable knowledge that may be used to support timely decision making.

BACKGROUND

Transforming raw data into actionable knowledge at speed, at scale, and in a highly secure and highly predictable fashion is an age-old problem that spans both personal and professional contexts. This is also something that organizations have spent considerable resources on over the years, to see only mixed results.

Although progress has been made in recent years in accelerating data transformations to insights, for example, through the use of real-time data pipeline technologies such as Kafka, the problem still has not been solved because the approach that is widely used in the industry is fundamentally flawed. Some example problems are discussed below.

For example, a typical approach to streaming data records is to flatten/serialize the data objects into a format that a streaming data pipelines can handle. For example, for a SQL record, which may contain data, relationships and restrictions, to be streamed through Kafka, that SQL record must be serialized into a byte array or JSON (JavaScript Object Notation) object. Serializing the SQL record into a flat JSON leads to loss of information as critical insights that had been modelled as relationships and restrictions inside the SQL record are now lost.

Another problem with current approaches concerns batch, as compared to real-time, data processing. For years, batch data processing has been the industry go-to solution for low-cost data processing. Batch data processing is the processing of a large volume of data all at once. For example, in the case of a daily batch processing job, the data can consist of millions of records for that day stored in a variety of formats, such as files or records for example.

In preparation for a batch processing job, data is typically staged, or temporarily stored, at designated locations such as databases, object stores, or filesystems, for example, and marked for processing. Next, the batch processing job is launched, the staged data sets are fed into it, and the results are captured and checked for accuracy. Lastly, the batch processing job is terminated, and the staged data sets are removed.

Although it is widely recognized in the industry that real-time data processing addresses the on-time needs of the user, conventional approaches to real-time data processing have produced at least two major side effects. Particularly, conventional approaches to real-time data processing typically provide incomplete/insufficient insights, and/or incorrect insights. As a result, there remains a need to provide real-time data processing approaches that address these problems.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
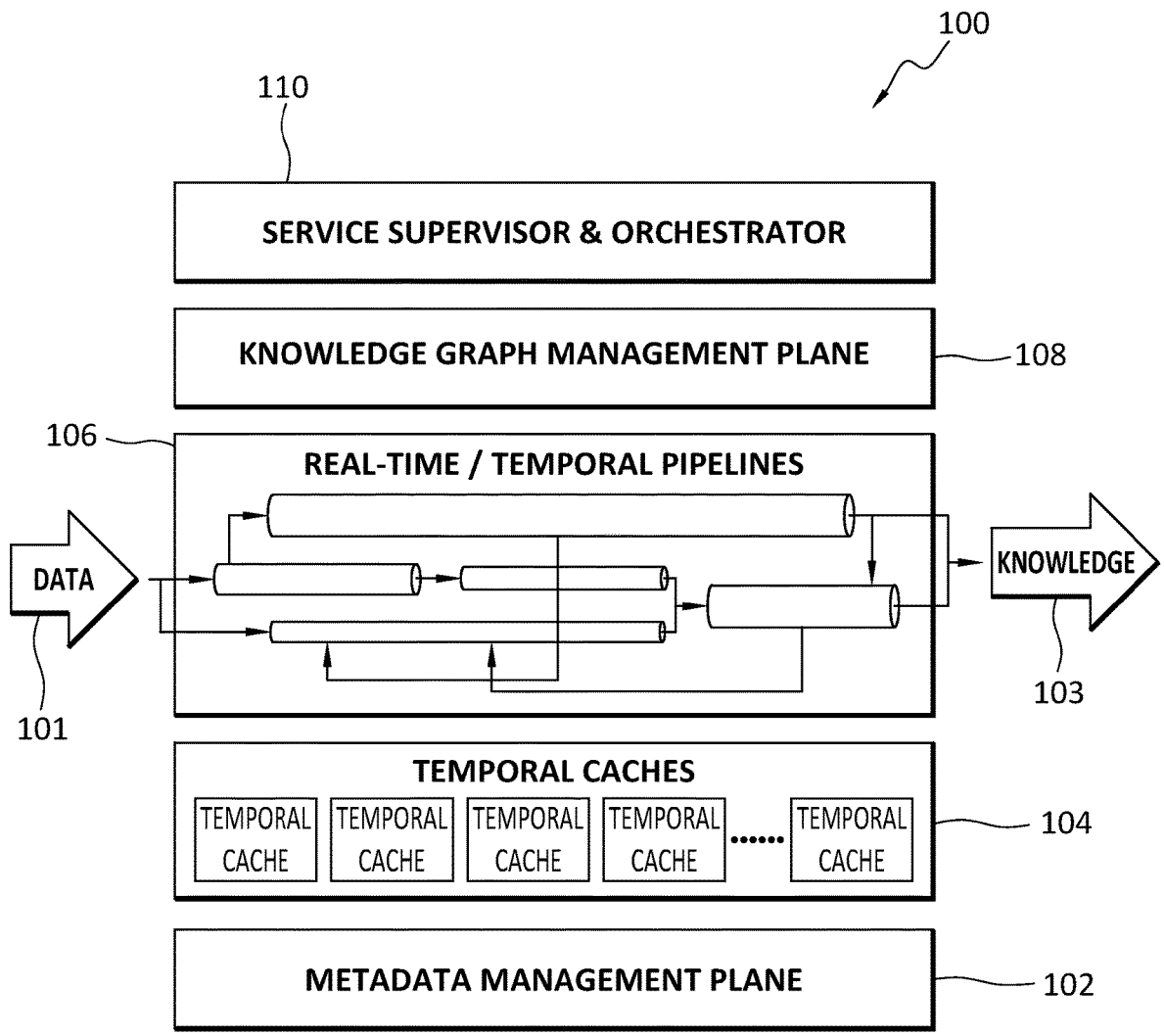
FIG. 1 discloses aspects of an example analytics pipeline and associated components, according to some embodiments.

Embodiments of the present invention generally relate to data analytics. More particularly, at least some embodiments of the invention relate to systems, hardware, software, computer-readable media, and methods for reducing or eliminating delays in evaluating and transforming raw data into actionable knowledge that may be used to support timely decision making. Some particular embodiments may employ graph models combined with analytics functions built right into the data pipelines to in order to reduce, or eliminate, one or more barriers to timely delivery of high value insights.

Example embodiments may operate to maintain the high accuracy of data and to eliminate information loss due to the flattening of the data records in preparation for being streamed. Eliminating information loss due to streaming may enable high-value analytics to be pushed much earlier in the data processing cycle and much closer to where the data is streamed from. Example embodiments may shorten the time-to-insights and allows advanced analytics to be pushed all the way to the edge, that is, an edge computing environment.

In order to address the need for on-time insights, while maintaining a high level of the quality of those insights, example embodiments may leverage a highly relational Graph data structure to underpin even the most complex data sets, and add technical enhancements to support the temporal nature of the real-time data processing. Note that it is often the case that high data complexity leads to highly insightful business intelligence.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may operate to reduce, or eliminate, delays in transforming raw data into actionable knowledge that can be used to support timely decision making. As another example, an embodiment may operate to transform raw data in a way that enables correct, and actionable, insights to be obtained from that data. Various other advantages of example embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

Delays in making data-driven decisions can lead to significant business and personal losses. For example, the delayed decision of a CEO to act upon real-time competitive threats may leave room for competitors to build stronger presence, all at the expense of the increasingly costly efforts of the company. As another example, a doctor learning about patient preconditions, such as diabetes or heart conditions, after administering a treatment, may have devasting effects on the health and well-being of the patient. Similarly, a delayed decision by a network security engineer to turn off a network segment, such as in response to an active ransomware attack, may lead to business and financial liabilities measured in the millions of dollars, or more.

B. Aspects of Some Example Embodiments

In today's "everything now" world in which there is pressure to deliver information, results, and insights, as quickly as possible, delays, such as those examples noted above, can cause significant problems. To make timely decisions based on actionable knowledge, businesses demand technology solutions that put timely insights front and center to all aspects of the data services design and implementation, from the infrastructure design to service delivery and support. Thus, example embodiments may operate to reduce, or eliminate, delays in transforming raw data into actionable knowledge that may be used to support timely decisions.

B.1 Context

Example embodiments may take into consideration various limitations of conventional data pipeline solutions. One of such limitations is that conventional approaches perform a flattening process on data objects such as JSON, XML, or binary arrays, that leads to information loss that impacts all downstream clients and consumers of the flattened data.

Another such limitation is that it is difficult, or impossible, for conventional approaches to tune each individual stream inside a data pipeline to specific operational requirements, such as data volume, transport latency, and observability. For example, existing pipeline solutions such as Kafka are simply not configured to provide that level of versatility.

Further, applying processing to data while the data is being streamed is complex and introduces delays. The compute capacity, which may be implemented using VMs (virtual machines) and containers for example, to run the processing jobs is simply not present in conventional data pipelines. While some approaches attempt to avoid this problem, such as by using Flink jobs which turn the pipeline into micro-segments, those approaches nonetheless present significant technical problems in the areas of data insights quality, latency.

Managing data state inside conventional data processing pipelines is very limited. More precisely, trying to cache specific data records inside the pipeline leads to extremely complex runtime configurations that are nearly impossible to scale. Once the data leaves the pipeline, the only way to access old data is retrieve it from disk, and that is only possible if the pipeline engineer has not forgotten to enable disk persistence in the pipeline runtime configuration. Querying old data from disk introduces major delays which will likely slow the whole pipeline to a crawl.

B.2 General Considerations

Limitations and problems such as those noted herein may be addressed by various aspects of example embodiments. Such aspects may include, but are not limited to the ability to stream not only flat, but also multi-dimensional, data structures, examples of which include graph data models. As another example, embodiments may implement real-time data streaming, as well as real-time analytics capabilities, such as analyzing data in real-time as the data is streamed, rather than using a batch analysis process.

Further, embodiments may provide high accuracy and high value of the insights produced by analytics jobs by, for example, intelligently caching certain data records, rather than entire articles, and making those records available to analytics jobs on demand. As an illustration, suppose that there is a particular article published on the internet that has a paragraph of interest to a data analyst, while the rest of the article is of no particular interest. In a case like this, an embodiment may cache just the paragraph of interest, and not the entire article. This approach may also save processing time, and storage resources, relative to what would be required to process and store the entire article.

As a final example, embodiments may be operable to able to scale up/out both data streaming and data processing. This scaling may be implemented, for example, by providing adaptive ways to tailor infrastructure resources such as, for example, containers, GPUs (graphics processing units), and network 10 capabilities, to match runtime demands.

B.3 Particular Aspects of Some Example Embodiments

Example embodiments embrace, among other things, various ways to use knowledge graphs, distributed analytics and intelligent workload management to significantly reduce, or eliminate, the delay between data ingest and the generation of analytical insights gained from processing that data. To the extent that embodiments are able to stream multi-dimensional data records, such as graphs for example, with little or no material loss of precision, which may be achieved through the use of serialization, such embodiments constitute an advance over conventional technology. As well, embodiments may operate to add real-time analytics to multi-dimensional data records as those records are being streamed.

B.4 Implementation—Integrated Data Processing and Streaming

With attention now to FIG. 1, example embodiments embrace an architecture 100, which may be referred to herein as a 'stack' or as an 'analytics stack.' In general, the architecture 100 may receive data 101, such as streaming data for example, as input, and the architecture 100 may process the data 101, possibly in real-time as the data 101 is being streamed into the architecture 100, to generate 'knowledge' 103. The data 101 may comprise, for example, flat data structures, multi-dimensional data structures and multi-dimensional records, examples of which include, but are not limited to, graphs. The knowledge 103 that is generated, extracted, derived, and/or compiled, based on the analysis and other processing of the data 101 may comprise, but is not limited to, analytical insights, data trends, inferences based on part or all of the data, specific recommended actions, recommended timing for performance of specific recommended actions, identification of particular systems and persons recommended for performing one or more specific recommended actions, for example.

B.4.1 Metadata Management Plane

As shown in the example of FIG. 1, the architecture 100 may comprise various layers. The first layer, which may be the lowest layer is a metadata management plane 102. Among other things, the metadata management plane 102 may make available all the metadata-related functionality to the rest of the components, that is, the other layers in the architecture 100. In general, the metadata may relate to any or all of, the data 101, the knowledge 103, and any and all processes used to obtain the knowledge 103 from the data 101. Such metadata-related functionality may include, but is not limited to, metadata creation, metadata discovery, metadata searching, metadata indexing, metadata annotations, metadata ownership, and metadata versioning, for example. Other elements of the architecture 100 may use the metadata management plane 102 to, for example, store configurations, maintain system state, discover and learn about capabilities offered by other components.

In some embodiments, the metadata management plane 102 may be built on, or comprise elements of, a combination of three database engines, namely, MongoDB, Neo4j, and Riak, and may provide gRPC (Google Remote Procedure Call) microservices that may be implemented in Python. This configuration is provided only by way of example however, and is not intended to limit the scope of the invention in any way.

B.4.2 Temporal Caches Layer

With continued reference to FIG. 1, the example architecture 100 may include a temporal caches layer 104, which may sit above the metadata management plane 102 in the stack embodied by the architecture 100. In some embodiments, the temporal caches layer 104 may comprise a variable, and time-bound, collection of micro compute environments, such as containers and accelerators for example, that may host small chunks of data and apply micro transformations, or micro analytics, to those small chunks of data based on preset or dynamic parameters, which may be individually controlled by those micro compute environments.

The temporal caches layer 104 may operate to maintain the data state of ingested data, and may also cache ingested data for future use. In some embodiments, the temporal caches layer 104 may comprise, and/or, employ, an intelligent event-based architecture to scale up or down the micro compute environments as needed to process the data 101 once that data 101 has been ingested by the architecture 100. This intelligent event-based architecture may also operate to maintain multiple versions of portions, or all, of the ingested data, whether those are materialized views of data, point in time and selective snapshots, or incremental update trails.

To streamline software development at the same time with being able to simplify operational maintenance, the micro apps hosted by the micro compute environments of the temporal cache layer 104 may employ a particular architectural pattern called CQRS—Command-Query Responsibility Separation. The CQRS pattern may dictate a strict split within an application of the micro compute environment, that is, between the part of the application that deals with data processing and the part of the application that deals with handling external requests.

For the purposes of this disclosure, analytics are, at least in part, concerned with forming virtual records by collating information from different places and applying different validation rules or ML (machine learning) inference models to allow only certain results to be promoted. More specifically, the inference models, or validation rules, may be used to select certain portions of the data 101 for analysis. The inference models may learn, over time, to better select data for analysis and, as such, the inference approach may be dynamic. On the other hand, validation rules may tend to be static and do not implement a learning function or capability. The inference models and/or the validation rules may use pattern recognition, that is, patterns in the incoming data, to select portions of the data 101 for analysis.

As data is being selected for analysis, multiple new data representations are being produced. Approaches such as CQRS may enable the construction and use of analytics micro jobs that are able to separate original data models, such as inference models for example, from the analytics results that are being produced. By way of contrast, conventional data analytics platforms such as Tableau or MicroStrategy start off from the premise that the original data models and analytics insights need to be strongly correlated, and this is one reason why these conventional approaches have a difficult time handling multi cloud and edge data. To illustrate, if the data model comprises of purchase orders, those purchase orders may, or may not, provide adequate and relevant insights as to a monthly volume of business. Nonetheless, the purchase orders and monthly volume may be strongly correlated with each other in the sense that the business uses those purchase orders to make conclusions about monthly sales volume.

With continued reference to analytics micro jobs, implemented in micro compute environments, example embodiments may operate to break a relatively larger analytics job into portions, or micro jobs. By way of illustration, the analysis of an article may be broken into micro jobs, one of which might be a micro job for analyzing just the table of contents of the article, and another micro job may be written, for example, to analyze just the footnotes in the article. The various micro jobs may be reused over and over so that new micro jobs do not have to be continuously written for data analysis. Advantageously, if a problem occurs with a micro job, the relatively small nature of the micro job may enable rapid identification and resolution of the problem.

Absent the use of micro jobs, a data analysis operation may take a significantly longer period of time, and it may be timely and cumbersome to identify any problems. As well, because analytics may employ a group of micro jobs, each micro job may be tuned or modified on an individual basis, possibly separately from the other micro jobs and, in this way, the analysis of data may be fine tuned at a relatively granular level. To continue with the article example, it may be possible to modify only the table of contents micro job to provide better results from that portion of the analysis. Thus, the entire analytics process need not be evaluated and modified but, instead, only the particular area(s) of interest may be modified. Further, because the micro job is directed only to a certain portion of the article, that is, a subset of the data to be analyzed, the micro job may run faster and more efficiently, and more quickly produce results, than if micro jobs were not employed. Finally, micro jobs may also be deleted if/when they are no longer needed.

B.4.3 Real-Time/Temporal Pipelines

With continuing reference to FIG. 1, the example architecture 100 may include one or more real-time/temporal pipelines 106 which may, among other things, receive the data 101, and output the insights 103. As noted herein, the data 101 may be operated on by any/all layers of the architecture 100 in order to enable the insights 103 to be produced. In some particular embodiments, the real-time/temporal pipelines 106 may be streaming data pipelines that act as the "plumbing" between the temporal caches of the temporal cache layer 104, data ingest and data egress.

A primary role of some embodiments of the real-time/temporal pipelines 106 is to bring together string of micro transformations or micro analytics applied to the data in the temporal cache layer 104 micro compute environments and transform the micro transformations or micro analytics into macro transformations or macro analytics that may produce the actionable insights that knowledge workers may need, and the real-time/temporal pipelines 106 may make those insights available when the knowledge workers need the insights. In some example embodiments, the real-time/temporal pipelines 106 component may be built on a version of ZeroMQ (https://zeromq.org/), a platform that implements a low latency messaging queue, using a publisher-subscriber model, that may be customized to handle input data that is in the form of graph data structures.

B.4.4 Knowledge Graph Management Plane

As shown in FIG. 1, the example architecture 100 may comprise a knowledge graph management plane 108, which may comprise a component that operates to determine the proper macro analytics and the data intakes 101 needed to produce the actionable insights 103 expected by a user. The knowledge graph management plane 108 may use knowledge graph constructs to associate analytics to data, change the temporal parameters of the delivery (content and reasoning), and, using feedback-based learning systems such as AI (artificial intelligence), adjust various parameters of both the data 101 intake and the analytics 103 delivery based on user feedback, performance and cost targets set via policies, and, ultimately, control how the knowledge transforms and accumulates over time. To carry out its functions, the knowledge graph management plane 108 may use graph data models, Python microservices, an Istio service mesh, and Python SciPy, NumPy and Pandas libraries, all running on k8s (Kubernetes open-source container orchestration system).

As used herein, a graph data model may serve to connect and associate various heterogeneous data sets. To illustrate, suppose that a visit record is created when a patient visits a doctor. In connection with the visit, a prescription record, and a lab test record may also be created. Each of these three different records may comprise a different respective data model having a different respective structure. For example, the lab test record may be a spreadsheet, and the visit record may be a text file. Although the records may all have different structures, there is a need to ensure that they are all correlated with each other to ensure a correct and complete record for the patient. A graph data model may be used to connect and associate these records. In some embodiments, this connection and association may be expressed in a visual/visible manner.

B.4.45 Service Supervisor and Orchestrator

Finally, the example architecture 100 may comprise a service supervisor and orchestrator layer 110. In general, embodiments of the service supervisor and orchestrator layer 110 may comprise an operational dashboard that service operators and data owners may use to interface with the system. The service supervisor and orchestrator layer 110 may visually display the operational health of the system and its performance. The service supervisor and orchestrator layer 110 may also enable, by accepting input from a CLI (command line interface) or GUI (graphical user interface), human or software operators to set policies, audit performance, and communicate outcomes. This service supervisor and orchestrator layer 110 may run on a combination of Grafana (open source visualization and analytics software)/Prometheus (open source systems monitoring and alerting toolkit)/Python (high-level, interpreted, general-purpose programming language) and may be able to integrate with application performance management solutions such as, but not limited to, Datadog, ServiceNow or AppDynamics. As well, embodiments of the service supervisor and orchestrator layer 110 may employ an Istio backend to route operational insights 103 to registered clients, either direct call, callback, or event-based messaging via Slack, for example.

C. Example Methods

Figure 2:
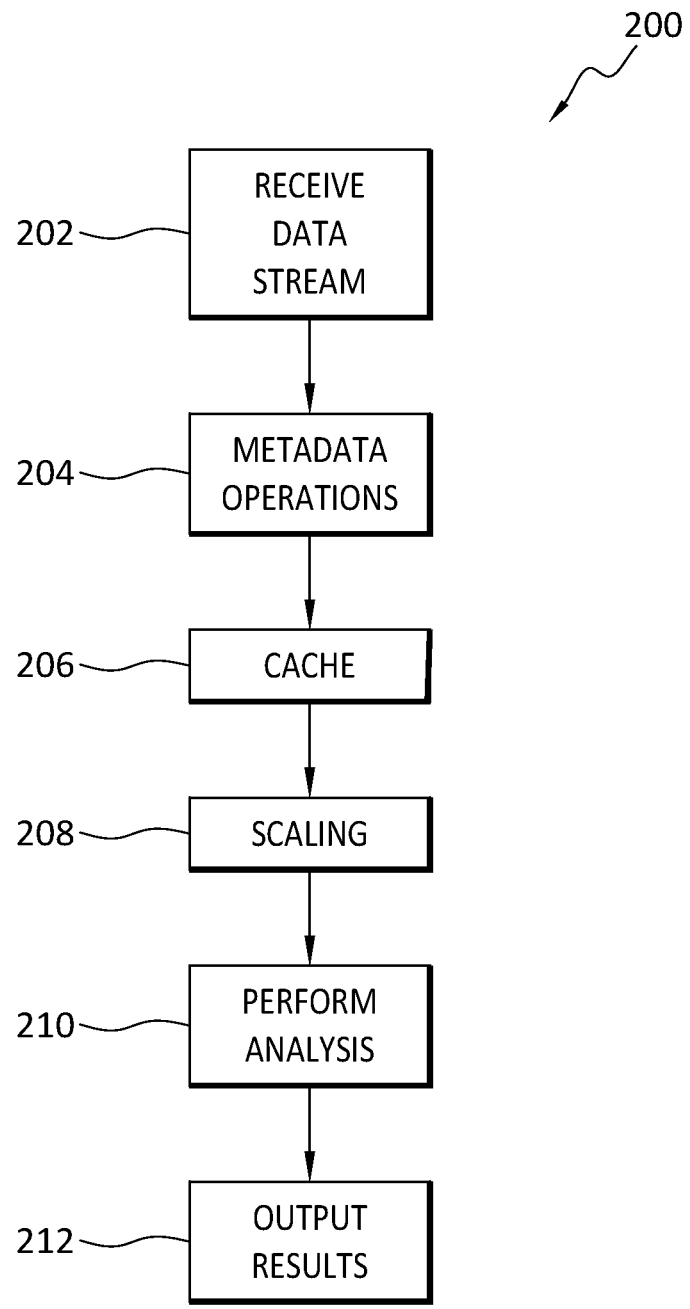
FIG. 2 discloses aspects of an example method for processing data to generate analytics, according to some embodiments.

It is noted with respect to the disclosed methods, including the example method of FIG. 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method 200 is disclosed. The method 200 may be performed in part, or in while, by an analytics stack that is configured to receive a data stream. The example method 200 may begin with the receipt 202, by the analytics stack, of a data stream. The data stream, which may be received 202 in real time from a data source as the data is generated by the data source, may comprise flattened data, multi-dimensional data structures such as graph data models, and/or un-serialized, data. The data stream may comprise one or more data sets, such as articles for example, that may each comprise one or more records, or other subsets of the data sets or articles.

As the data is received 202, metadata concerning the data may be generated and captured 204. Inference models and/or validation rules may be used to identify, and cache 206, specific records of interest to a user. The cached records may be available on-demand to one or more analytics micro jobs. As needed, the infrastructure associated with the analytics stack may be scaled 208 to accommodate the incoming data rate, and the analytics to be performed, and/or being performed, with respect to the incoming data. The scaling 208 may additionally, or alternatively, comprise scaling the data streaming rate, that is, the rate at which data is streamed to the analytics stack, and also the rate at which results are streamed from the analytics stack to a user.

The cached 206 data, such as respective portions of the cached data, may be analyzed 210 by one or more micro jobs. Because the data may be cached for only a very short time, the analyzing 210 may be performed in real-time as the data is streamed to the analytics stack. As a result of the analyzing 210, various insights concerning the data may be generated and output 212, such as to a user for example.

D. Further Example Embodiments

Following are some further example embodiments of the invention. These are presented only by way of example and are not intended to limit the scope of the invention in any way.

Embodiment 1. A method, comprising: receiving a data stream that comprises data in a form of multi-dimensional data structures; generating and storing metadata about the data; selecting, and caching, portions of the data; analyzing the cached data; and based on the analyzing, generating insights concerning the data that was analyzed.

Embodiment 2. The method as recited in embodiment 1, wherein the data stream is received in real time as it is generated.

Embodiment 3. The method as recited in any of embodiments 1-2, wherein the analyzing is performed in real time.

Embodiment 4. The method as recited in any of embodiments 1-3, wherein the generating insights comprises using a graph data structure to associate various portions of the data with each other.

Embodiment 5. The method as recited in any of embodiments 1-4, wherein the analyzing is performed using one or micro jobs.

Embodiment 6. The method as recited in embodiment 5, wherein each micro job analyzes a respective portion of the data.

Embodiment 7. The method as recited in any of embodiments 1-6, wherein the cache data resides in one or more temporal caches.

Embodiment 8. The method as recited in any of embodiments 1-7, further comprising scaling an infrastructure based on runtime demands.

Embodiment 9. The method as recited in any of embodiments 1-8, wherein the data stream further includes flat data structures.

Embodiment 10. The method as recited in any of embodiments 1-9, further comprising, prior to receiving the data stream, determining one or more parameters of the data stream, and determining how the data will be analyzed in order to generate the insights.

Embodiment 11. The method as recited in any of embodiments 1-10, further comprising using the original data or the derived knowledge to train an ML inference model to generate higher confidence/value knowledge/insights next time a user demand for analysis/insights is presented.

Embodiment 12. A system, comprising hardware and/or software, operable to perform any of the operations, methods, or processes, or any portion of any of these, disclosed herein.

Embodiment 13. A non-transitory storage medium having stored therein instructions that are executable by one or more hardware processors to perform operations comprising the operations of any one or more of embodiments 1-11.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media. Embodiments may employ various processing systems and components including, but not limited to, accelerators such as GPUs (graphics processing units), FPGAs (field-programmable gate arrays), and ASICs (application-specific integrated circuits).

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. In some embodiments, a computing system may comprise the federation of compute resources across multiple computer nodes, such as servers. In other embodiments of a computing system, software routines, objects, for example, may transcend the confines of a single computing node (server) and operate collaboratively across a group of servers that may, or may not, be physically collocated (same rack, room, or data center) or geo-distributed across countries, continents or geo-regions.

The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
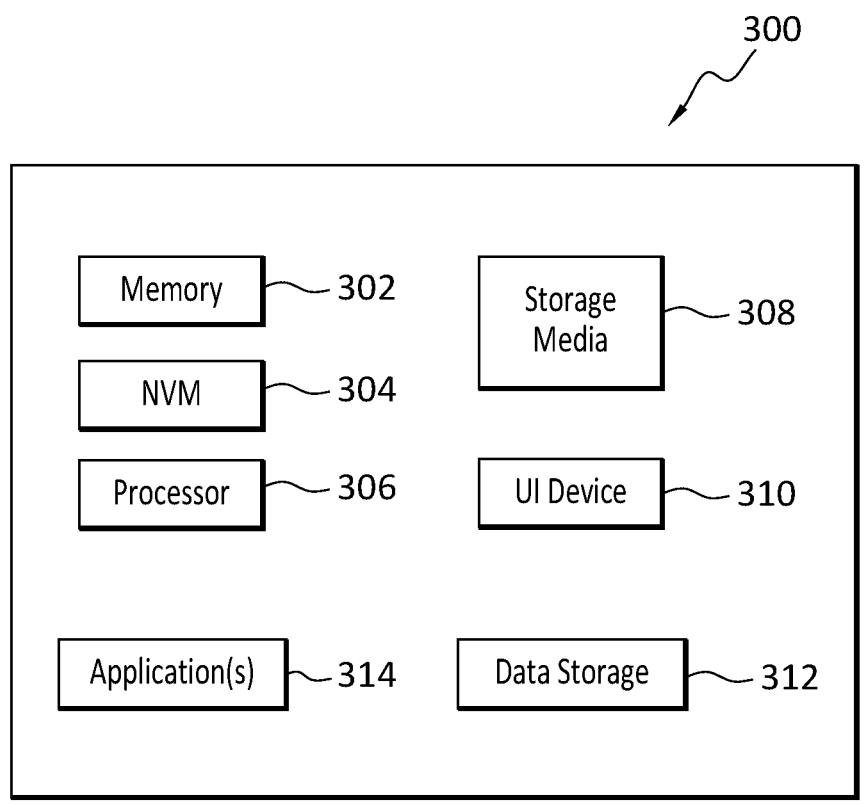
FIG. 3 discloses an example computing entity operable to perform any of the claimed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 302 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a data stream that comprises data in a form of multi-dimensional data structures;
   generating and storing metadata about the data;
   selecting, and caching, portions of the data;
   analyzing, by using a plurality of micro jobs, the cached data; and
   based on the analyzing, generating insights concerning the data that was analyzed, wherein each of the plurality of micro jobs analyzes a respective portion of the cached data, and wherein results of each of the plurality of micro jobs are separated from the cached data, and wherein the plurality of micro jobs are split between first micro jobs that deals with data processing and second micro jobs that deals with handling external requests.

2. The method as recited in claim 1, wherein the data stream is received in real time as it is generated.

3. The method as recited in claim 1, wherein the analyzing is performed in real time.

4. The method as recited in claim 1, wherein the generating insights comprises using a graph data structure to associate various portions of the data with each other.

5. The method as recited in claim 1, wherein the cache data resides in one or more temporal caches.

6. The method as recited in claim 1, further comprising scaling an infrastructure based on runtime demands.

7. The method as recited in claim 1, wherein the data stream further includes flat data structures.

8. The method as recited in claim 1, further comprising, prior to receiving the data stream, determining one or more parameters of the data stream, and determining how the data will be analyzed in order to generate the insights.

9. A non-transitory storage medium having stored therein instructions that are executable by one or more hardware processors to perform operations comprising:
   receiving a data stream that comprises data in a form of multi-dimensional data structures;
   generating and storing metadata about the data;
   selecting, and caching, portions of the data;
   analyzing, by using a plurality of micro jobs, the cached data; and
   based on the analyzing, generating insights concerning the data that was analyzed, wherein each of the plurality of micro jobs analyzes a respective portion of the cached data, and wherein results of each of the plurality of micro jobs are separated from the cached data, and wherein the plurality of micro jobs are split between first micro jobs that deals with data processing and second micro jobs that deals with handling external requests.

10. The non-transitory storage medium as recited in claim 9, wherein the data stream is received in real time as it is generated.

11. The non-transitory storage medium as recited in claim 9, wherein the analyzing is performed in real time.

12. The non-transitory storage medium as recited in claim 9, wherein the generating insights comprises using a graph data structure to associate various portions of the data with each other.

13. The non-transitory storage medium as recited in claim 9, wherein the cache data resides in one or more temporal caches.

14. The non-transitory storage medium as recited in claim 9, wherein the operations further comprise scaling an infrastructure based on runtime demands.

15. The non-transitory storage medium as recited in claim 9, wherein the data stream further includes flat data structures.

16. The non-transitory storage medium as recited in claim 9, wherein the operations further comprise, prior to receiving the data stream, determining one or more parameters of the data stream, and determining how the data will be analyzed in order to generate the insights.

* * * * *